(12) United States Patent
Tagawa et al.

(10) Patent No.: US 7,315,829 B1
(45) Date of Patent: Jan. 1, 2008

(54) DATA CONVERSION APPARATUS AND METHOD IN COPYRIGHT PROTECTING SYSTEM

(75) Inventors: Kenji Tagawa, Osaka-fu (JP); Masayuki Kozuka, Arcadia, CA (US); Masataka Minami, Burbank, CA (US); Tetsuo Maeda, Hyogo-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 673 days.

(21) Appl. No.: 09/436,656

(22) Filed: Nov. 9, 1999

(30) Foreign Application Priority Data

Nov. 9, 1998 (JP) .................................. 10-317431

(51) Int. Cl.
G06Q 30/00 (2006.01)

(52) U.S. Cl. .............................. 705/26; 705/54; 705/57

(58) Field of Classification Search .................. 705/26, 705/27, 51, 52, 53, 54, 57, 58, 59
See application file for complete search history.

(56) References Cited

U.S. PATENT DOCUMENTS

| | | | | |
|---|---|---|---|---|
| 5,103,392 A | * | 4/1992 | Mori | 705/53 |
| 5,418,713 A | | 5/1995 | Allen | |
| 5,592,511 A | | 1/1997 | Schoen et al. | |
| 5,673,316 A | * | 9/1997 | Auerbach et al. | 705/51 |
| 5,737,415 A | * | 4/1998 | Akiyama et al. | 705/53 |
| 5,848,154 A | * | 12/1998 | Nishio et al. | 705/51 |
| 5,870,467 A | * | 2/1999 | Imai et al. | 705/57 |
| 5,987,429 A | * | 11/1999 | Maritzen et al. | 705/31 |
| 6,075,862 A | * | 6/2000 | Yoshida et al. | 380/28 |
| 6,081,840 A | * | 6/2000 | Zhao | 709/224 |
| 6,233,684 B1 | * | 5/2001 | Stefik et al. | 713/176 |
| 6,301,660 B1 | * | 10/2001 | Benson | 713/165 |
| 6,463,539 B1 | * | 10/2002 | Mochizuki | 713/193 |

FOREIGN PATENT DOCUMENTS

| | | |
|---|---|---|
| EP | 0561685 | 9/1993 |
| EP | 0778513 | 6/1997 |
| EP | 0788080 | 8/1997 |
| EP | 0813194 | 12/1997 |
| EP | 0942417 | 9/1999 |

(Continued)

OTHER PUBLICATIONS

Mori, R. et al., "Superdistribution: The Concept and the Architecture", pp. 1133-1146, 1990, The Transactions of the IEICE, vol. E 73, No. 7, Tokyo, JP.*

(Continued)

*Primary Examiner*—Gerald J. O'Connor
(74) *Attorney, Agent, or Firm*—Wenderoth, Lind & Ponack, L.L.P.

(57) ABSTRACT

In a data conversion apparatus of a copyright protecting system, a data format judging portion judges whether or not the data is of a super distribution format, attribute information obtaining unit identifies the audio contents of the data and obtains the attribute information corresponding to the identified audio contents from the external equipment via the data transmission/receiving portion; and a data format conversion portion converts the audio contents together with the obtained attribute information to the super distribution data format to be supplied to an external recording apparatus.

12 Claims, 10 Drawing Sheets

FOREIGN PATENT DOCUMENTS

| | | |
|---|---|---|
| JP | 5-257816 | 10/1993 |
| JP | 9-34841 | 2/1997 |
| RU | 95113961 | 12/1997 |
| WO | 94/14281 | 6/1994 |

OTHER PUBLICATIONS

Patent Abstracts of Japan, vol. 1997, No. 06, Jun. 30, 1997 & JP 09 034841A (Fujitsu Ltd.), Feb. 7, 1997.

R. Mori et al., "Superdistribution: An Electronic Infrastructure for the Economy of the Future" Joho Shori Gakkai Ronbunshi—Transactions of Information Processing Society of Japan, JP, Tokyo, vol. 38, No. 7, Jul. 1, 1997, pp. 1465-1472.

U.S. Appl. No. 09/358,820, filed Jul. 22, 1999, Kenji Tagawa et al., entitled "Digital Data Recording Apparatus, Digital Data Recording Method, and Computer-Readable Recording".

U.S. Appl. No. 09/414,727, filed Oct. 8, 1999, Kenji Tagawa et al., entitled "A Recording Medium That Stores a Content, a Digital Data Recording Device That Records Digital Data Onto a Recording Medium, a Digital Playback Device That Plays Digital Data Recorded at a Recording Medium, a Content Packaging Device That Produces a Package Containing a Plurality of Contents, a Content Playback Device That Plays a Content After Extracting the Content From a Package, a Computer-Readable Recording Medium, a Recording Method, a Playback Method, a Content Packaging Method, and a System Comprising the Content Packaging Device and the Content Playback Device".

\* cited by examiner

Fig.3

| | |
|---|---|
| USER ID 201 | 24BITS |
| ISRC INFORMATION 202 | 24BITS |
| COPY CONTROL INFORMATION 203 | 1BIT |
| CIPHERING INFORMATION 204 | 1BIT |
| CHARGE INFORMATION 205 | 16BITS |
| CONTENTS DECIPHERING KEY 206 | 24BITS |
| CONTENTS 207 | nBITS |

Fig.4

| MUSIC TITLE /301 | SINGER'S NAME /302 | PRICE /303 | DATA SOURCE ADDRESS /304 |
|---|---|---|---|
| MUSIC A | A | 100YEN | www.song/song01 |
| MUSIC B | B | 10YEN | www.song/song02 |
| MUSIC C | C | 0YEN | www.song/song03 |
| MUSIC D | D | 30YEN | www.song/song04 |
| MUSIC E | E | 10YEN | www.song/song05 |

Fig.5

| INDEX No. /401 | START ADDRESS /402 | END ADDRESS /403 |
|---|---|---|
| 1 | 1 | 100 |
| 2 | 1208 | 1278 |
| 3 | 1279 | 1350 |
| 4 | 707 | 811 |
| 5 | 105 | 184 |
| 6 | 200 | 290 |
| 7 | 300 | 395 |

Fig.9

| MUSIC TITLE /301 | SINGER'S NAME /302 | COMPRESSION FORMAT /801 | PRICE /303 | DATA SOURCE ADDRESS /304 |
|---|---|---|---|---|
| MUSIC A | A | LPCM | 100YEN | www.song/song01.1 |
| MUSIC A | A | AAC | 50YEN | www.song/song01.2 |
| MUSIC B | B | LPCM | 30YEN | www.song/song02.1 |
| MUSIC B | B | AAC | 10YEN | www.song/song02.2 |

DATA CONVERSION APPARATUS AND METHOD IN COPYRIGHT PROTECTING SYSTEM

BACKGROUND OF THE INVENTION

1. Field of the Invention

The present invention generally relates to a digital data copyright protecting system, and more specifically relates to a data conversion apparatus and method thereof in a copyright protecting system in which, when e.g. audio data recorded in such as compact disc is recorded by copying to a portable recording medium such as semiconductor memory, the audio data is converted to the same data format as that of network distribution data to be primarily recorded so that the data format can be standardized in the processing to thereby protect a copyright of non-ciphered audio data as well as ciphered data by collecting suitable royalties on the copyright. In the copyright protecting system, ciphered electronic audio data is distributed from an external distribution center via an internet or the like to be primarily recorded in a hard disc of such as a personal computer. Meanwhile, non-ciphered audio data read out of compact disc is also distributed by way of package distribution and the distributed audio data is once ciphered to have a data format same as that of the electronic audio data distributed via an internet so that the ciphered data is recorded in the same hard disc of the personal computer. Thereafter, in the subsequent recording process for copying, the recorded audio data is further ciphered to another standardized ciphering system to be secondarily recorded in the hard disc of the personal computer. Thus, the system enables collection of suitable royalties on the copyright for copying such as CD audio data.

2. Description of the Prior Art

In recent years, package medium such as compact disc (referred to as "CD" hereinafter) has formed the greater part of music data distribution. However, the CD medium hardly copes with pirated edition, namely, illegal copies. Moreover, an equipment, which can easily create CD-R (Compact Disc Recordable) based on the music CD, is on the market, and therefore anybody can make a copy from original edition, and therefore the copyright protection insufficient under the present conditions.

In addition, the format of copying contents of CD onto MD (Mini Disc) for listening thereto has been widely spread. At this time, the obtained copy deviates from the scope of personal amusement and the copy is frequently given to others. As a result, there arises a problem that this inflicts a loss on all rights reserved. In order to improve such a situation, Japanese Patent Application Laid-Open No. 9-34841 (1997) discloses a system which distributes CD storing ciphered software and distributes a deciphering key on-line in response to a request sent by a user while setting a charge for the distribution.

However, in this conventional system disclosed in Japanese Patent Application Laid-Open No. 9-34841 (1997), it is necessary to inquire to the host computer center about obtaining the deciphering key even within the range of personal amusement and to pay on the charge. Therefore, this possibly inflicts a loss on a user. Moreover, since an equipment under usage by the user can be usually used for only CD recorded with non-ciphered data, the user should additionally purchase a reproducing equipment for ciphered CD data, and this inflicts a great loss on the user.

SUMMARY OF THE INVENTION

The present invention has been developed to solve such conventional problems, and it is an essential object of the invention to provide a copyright protecting system and method which protects a copyright even when non-super distribution format data such as CD or DVD audio data is distributed by package medium as well as super distribution format data distributed via an online network while setting a suitable charge of a copyright when deviating from the range of personal amusement so as to be capable of protecting all rights reserved. By this arrangement, there is provided an improved copyright protecting system having an equipment and software carrier aiming to secure the copyright protection while developing an improvement copyright protection technology and mechanism making good use of CD property in common to electronic music distribution (EMD) via network.

In order to achieve the objects mentioned above, the first aspect of the present invention provides a data conversion apparatus converting data including audio contents to super distribution format data and outputting the super distribution format data to be supplied to an external recording apparatus to be recorded therein.

The super distribution format data includes the audio contents and attribute information which represents at least a charge condition permitting a copy of the audio contents.

The data conversion apparatus comprises:

an attribute information obtaining section for identifying the audio contents of the data and obtaining the attribute information corresponding to the identified audio contents from the external equipment via the data transmission/receiving section;

a controller controlling the data transmission/receiving section, data format judging section, attribute information obtaining section and data format conversion section, wherein, in the case where the data format judging section judges that the received data is not of the super distribution format, the attribute information obtaining section is so controlled as to obtain the attribute information corresponding to the audio contents from the external equipment, and wherein the data format conversion section is so controlled as to convert the received audio contents together with the obtained attribute information into the super distribution format data, so that the resultant data converted to the super distribution data format is outputted and supplied to the external recording apparatus.

Another aspect of the present invention provides a data conversion method converting data including audio contents to super distribution format data and outputting the super distribution format data to be supplied to an external recording stage to be recorded therein.

The super distribution format data includes the audio contents and attribute information which represents at least a charge condition permitting a copy of the audio contents.

The data conversion method comprises:

controlling the data transmission/receiving, data format judging, attribute information obtaining and data format conversion, wherein, in the case where the data format judging judges that the received data is not of the super distribution format, the attribute information obtaining is so controlled as to obtain the attribute information corresponding to the audio contents from the external equipment, and wherein the data format conversion is so controlled as to convert the received audio contents together with the obtained attribute information into the super distribution format data, so that the resultant data converted to the super distribution data format is outputted and supplied to the external recording stage.

A further another aspect of the present invention provides a program storage medium storing a program of a data conversion method converting data including audio contents to super distribution format data and outputting the super distribution format data to be supplied to an external recording stage to be recorded therein.

The super distribution format data includes the audio contents and attribute information which represents at least a charge condition permitting a copy of the audio contents.

The data conversion method comprises:

judging whether or not the data is of a super distribution format;

identifying the audio contents of the data and obtaining the attribute information corresponding to the identified audio contents from the external equipment;

converting the audio contents together with the obtained attribute information to the super distribution data format; and controlling the data transmission/receiving, data format judging, attribute information obtaining and data format conversion, wherein, in the case where the data format judging judges that the received data is not of the super distribution format, the attribute information obtaining is so controlled as to obtain the attribute information corresponding to the audio contents from the external equipment, and wherein the data format conversion is so controlled as to convert the received audio contents together with the obtained attribute information into the super distribution format data, so that the resultant data converted to the super distribution data format is outputted and supplied to the external recording stage.

By this arrangement, audio data, which is non-super super distribution formatted data and recorded on CD medium or the like, is converted into a data format for network super distribution and primarily recorded so that the data can be dealt similarly to the network super distribution. As a result, when a copy is created beyond the scope of personal amusement, a suitable charge for a copyright can be collected, and a great effect can be produced.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 3 is a diagram showing a data structure of music data to be recorded in a primary recording medium;

FIG. 4 is a diagram showing information to be displayed when music data is distributed via internet in the first embodiment of the present invention;

FIG. 5 is a data management file when the music data is recorded in a primary recording medium;

FIG. 9 is a diagram showing information to be displayed when music data is distributed via internet in the second embodiment of the present invention;

DETAILED DESCRIPTION OF THE PREFERRED EMBODIMENTS

Figure 1:
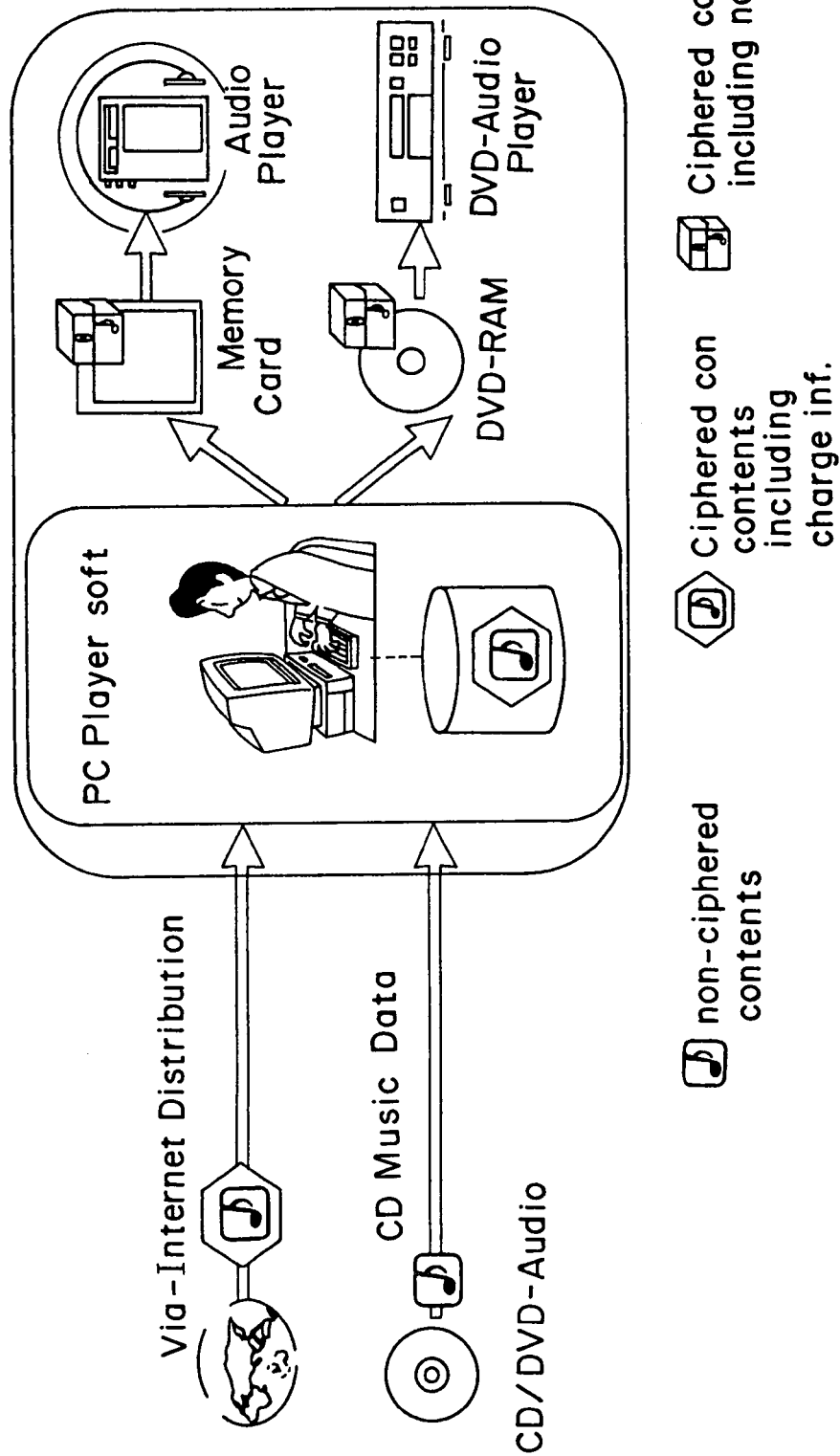
FIG. 1 is a schematic view showing a music data distribution service system of the present invention.

Before the detailed description proceeds, it is noted that like parts are designated by like reference numerals throughout the accompanying drawings.

There will be described below embodiments of the present invention with reference to the drawings.

FIG. 1 shows an outline of a data copyright protection system in a music data distribution service according to the present invention. As an example of a data distribution route for distributing music data, there are typically used internet or the like online network distribution method and a package medium distribution for distributing such as CD and DVD data. In the distribution method via internet, previously ciphered music data including charge information is distributed to a user via such as a telephone modem so that the distributed data is primary recorded on such as a hard disk serving as a primarily recording medium of a user-side personal computer (referred to as "PC" hereinafter).

Meanwhile, in the distribution method using a general package medium, non-super distribution formatted music data contents are distributed to a user-side PC via a disk drive (not shown). The user primarily records the distributed data on the hard disk of the PC using an exclusive application software (referred to as "PC player soft" hereinafter. At this time, the distributed data is added with attribute information (to be described later) such as charge information and is then ciphered to have the same ciphered data format as that of the super distribution format data distributed via internet. Thus, the resultant ciphered data having the same encryption format is primarily recorded on the hard disk. By this arrangement, a data distribution system can be preferably achieved to have convenience characteristics obtained both in the distribution method via internet and in the distribution method using package medium. That is, in the via-internet distribution method, a variety of music data can be easily selected by retrieving from an interactive music database, while in the package medium method, music data and related information can be easily obtained on sale via a distribution method of a low cost.

It is noted here that the term "PC player soft" (i.e. exclusive application software) indicates software having a function of executing down-load of music data, primarily recording data on a hard disc of PC, secondarily recording data on a portable recording medium, reading data out of a package medium such as CD, charging process and the like.

The ciphered data primarily recorded on the hard disc of the user-side PC is read out and fed to a secondary recording stage for copying where the data is secondarily ciphered to be standardized having another ciphered data format including no charge information (to be described later). The secondarily ciphered data is secondarily recorded on a secondary recording medium such as semiconductor memory card (depicted as "Memory Card" in FIG. 1) or DVD-RAM. The secondarily recorded data on the semiconductor memory card is read out and reproduced for listening by means of an audio player (depicted as "Audio Player" in FIG. 1), alternatively, the secondarily recorded data on the DVD-RAM is reproduced by means of a DVD-Audio Player.

Embodiment 1

Figure 2:
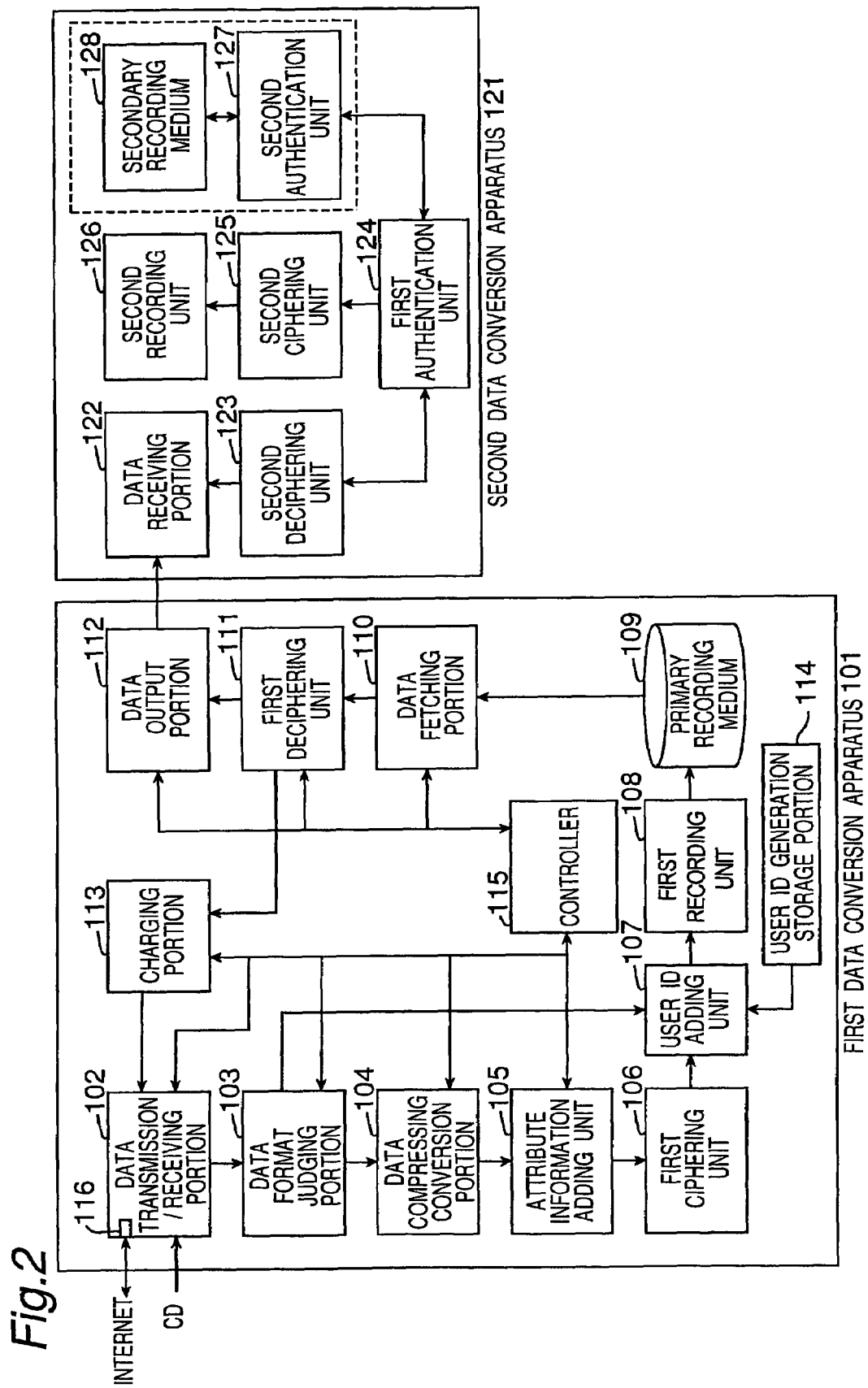
FIG. 2 is a block diagram showing a constitution of a digital data copyright protecting system according to a first embodiment of the present invention.

FIG. 2 is a constitutional diagram showing a digital data copyright protecting system according to a first embodiment of the present invention, which the digital data copyright protecting system includes a data conversion system composed of a first data conversion apparatus 101 and a second data conversion apparatus 121.

The first data conversion apparatus 101 is interconnected with a host computer of a system control center (not shown) via an online network, and the second data conversion apparatus 121 serving as an external recording apparatus is connected to the first data conversion apparatus 101 via such as a PCMCIA (Personal Computer Memory Card International Association) bus which is described later. It is assumed that the system control center includes external servers (not shown) having a database storing such as customer (subscriber) information and charge information and a database storing copyright owner (author) and music data information, thereby supervising the control of customers, control of charging, sales and forwarding process. The first data conversion apparatus 101 receives audio contents and/or attribute information corresponding to audio contents from the external servers of the system control center via a digital network.

In this constitution, the data conversion system compatibly receives data distributed both via internet and via disc medium such as CD. The first data conversion apparatus 101 is realized generally by a personal computer (PC), which includes a data transmission/receiving portion 102 including at least a network interface 116, data format judging portion 103, data compressing conversion portion 104, attribute information adding unit 105, first ciphering unit 106, user ID adding unit 107, first recording unit 108, primary recording medium 109, data fetching portion 110, first deciphering unit 111, data output portion 112, charging portion 113, user ID generation storage portion 114, and controller 115 for controlling the entire parts of the apparatus. The PC player soft is initially installed in the first data conversion apparatus 101 to primarily record on the hard disc the primarily ciphered music data including attribute information such as charge information. The primarily recorded data is fetched out of the hard disc and then fed to the second data conversion apparatus 121 where the applied data is secondarily ciphered in another standardized encryption format and then secondarily recorded on a secondary recording medium for further copying proceeding. In this construction, the data format judging portion 103 judges whether or not the received data format is of super distribution.

The second data conversion apparatus 121 is composed of e.g. a card adaptor of PCMCIA (Personal Computer Memory Card International Association) in the present embodiment, and includes a data receiving portion 122, second deciphering unit 123, first authentication unit 124, second ciphering unit 125, second recording unit 126, second authentication unit 127 and a secondary recording medium 128. Here, the second authentication unit 127 and the secondary recording medium 128 constitute one unit such as a semiconductor (SD) memory card which is detachably attached to the card adaptor of the second data conversion apparatus 121 and loaded onto such as a portable SD-Audio player to reproduce the recorded audio data.

Here, the second authentication unit 127 has a control function and mediates between the secondary recording medium 128 and the first authentication unit 124, performing a command/response operation therewith. The secondary recording medium 128 is composed of a flash memory such as EEPROM (Electrically Erasable Programmable Read-Only Memory).

It is noted here that, although the explanation is made in the present embodiment that the second data conversion apparatus 121 is composed of a card adaptor of PCMCIA, the second data conversion apparatus 121 may be composed of a DVD-RAM drive applicable to a DVD audio player.

Here, in the present embodiment, the explanation is made assuming that data to be recorded is music data, and the music data is super distribution data distributed via internet, or usual non-ciphered data read out of a disc medium such as CD which is inputted to the first data conversion apparatus 101 via a CD drive. The term "super distribution data" means distribution data ciphered to an AAC (Advanced Audio Coding) format including attribute information such as at least charge information, which the cipherment thereof is released (i.e. deciphered) by completing the charging process. That is, possession of the super distribution data per se is not charged but usage for copying thereof is charged. The super distribution data may be secondarily distributed to others, and when secondarily distributed, the data supply source user supplying the data is specified by reference to user ID (to be described later) so that the supply source user can be given a privilege. In this case, the controller 115 may so control the data output portion 112 as to supply the received super distribution format data to the external recording apparatus 121.

FIG. 3 shows an example of a data structure depicted in a unit of bit stored in the primary recording medium 109, that is, in the case where the ciphered music data distributed via internet is recorded on the primary recording medium 109 or in the case where the non-ciphered music data of CD ciphered to have the same cipherment format as that of the super distribution data is recorded on the primary recording medium 109.

In FIG. 3, a user ID 201 (24 bits) is information indicative of individual users which is generated and stored by the user ID generation storage portion 114 when the PC player software for operating the data conversion system is installed in the PC. Only this information is added to the music data when the ciphered music data is recorded on the primary recording medium 109. Namely, in the via-internet distribution, the contents and the attribute information 202 to 206 other than the user ID 201 are the data structure of the music data distributed via internet from the database of the host computer of the system control center. The user ID 201 specifies the supply source user supplying the secondarily distributed data, which the information is based on the super distribution concept.

ISRC information 202 (24 bits) is unique information for each music data. Here, ISRC (International Standard Recording Code) is composed of a country code (two ASCII characters), owner code (three ASCII characters), recording year (a two-digit number) and serial number (a five-digit number), and these unique codes are given to individual pieces of music. Namely, each music data can be specified based on the ISRC information 202.

Copy control information 203 (1 bit) is information representing copy permission/non-permission of the music data as to whether the music data is permitted or not to be secondarily recorded to the secondary recording medium 128, and this information can take two kinds of values of permission and non-permission. For example, when a copy is permitted, the information takes value "0", and when a copy is not permitted, the information takes a value "1".

Ciphering information 204 (1 bit) is information representing as to whether or not the music data is ciphered, and this information can take two kinds of values, ciphered and non-ciphered. For example, when the music data is not ciphered, the information takes a value "0", and when the music data is ciphered, the information takes a value "1".

Charge information 205 (16 bits) represents an amount of the charge for copying of the music data. Here, an amount of the charge is set in unit of "yen", but the charge amount may be set in other unit such as dollar or mark.

A contents deciphering key 206 (24 bits) is information containing a deciphering key for releasing encryption of the ciphered contents 207. That is, the contents information 207 is data representing music data main frame, which is ciphered when necessary.

Here, the data information other than the contents 207, namely, the user ID 201, ISRC information 202, copy control information 203, ciphering information 204, charge information 205 and contents deciphering key 206 are called as "attribute information" hereinafter. Since the attribute information includes important information such as an amount of a charge, it is desirable that the attribute information is previously ciphered so as not to be altered. Hereinafter, in the present embodiment, it is assumed that, the attribute information, i.e., the user ID 201, ISRC information 202, copy control information 203, ciphering information 204, charge information 205 and contents deciphering key 206 are previously ciphered in a given encryption format, and a deciphering (decoding) key for deciphering the attribute information is stored in a specific area (not shown) of a PC player software for operating the copyright protecting system of the present embodiment. The attribute deciphering key can be used when a user installs the PC player software. Moreover, the attribute deciphering key is recorded in an area which cannot be accessed by a normal operation by the user. In this embodiment, in the case of super distribution data via internet, the contents 207 are also previously ciphered in a given encryption format similar to that of the attribute information.

Meanwhile, as for distribution of music data recorded on CD medium, the contents (music data main frame) are recorded together with the ISRC information in combination, where the contents are not ciphered (i.e., normal CD format) and the ISRC information 202 is stored in a TOC pattern area of CD.

The following describes an operation of the data copyright protection system according to the present embodiment. The data transmission/receiving portion 102 compatibly receives music data obtained via internet and/or music data obtained from CD medium. When the music data is obtained via internet, for example, the music data is received via a modem (not shown). Meanwhile, when the music data is obtained from CD medium, the music data is received via a CD drive (not shown).

First, the description will be given as to the operation when the ciphered music data of super distribution data is obtained via internet. FIG. 4 shows an example of information displayed on a display section (not shown) such as a display of PC when music data is obtained via internet. The information to be displayed is composed of contents which arouse a user interest such as a music title 301, singer's name 302, price 303 and data source address 304. Here, the music title 301 and the singer's name 302 are information representing a music title and singer's name of the music data.

The price 303 represents an amount of charge which charges the user for downloading the music and recording on the secondary recording medium 128 for copying. The data source address 304 is access information for accessing to the database URL (Uniform Resource Locator) of the system control center where the corresponding music is recorded. The user selects a desired piece of music by operating an input section such as a mouse and keyboard (not shown) based on these information, and the user can inform the host computer of demand for purchase via the data transmission/receiving portion 102.

There will be described below the case where non-super distribution formatted music data is obtained from CD medium. At this time, only information such as a music title stored in the TOC pattern area of CD is displayed on the display unit of PC. A user may select desired music by inputting a title and article number or the like via an input section (not shown) such as a mouse and keyboard with reference to the music title information or information described in a jacket or the like attached to the music CD, and then the user informs the host computer of the demand for purchase via the data transmission/receiving portion 102.

Here, the attribute information adding unit 105 may extract identification information peculiar to CD such as a number of pieces of the audio contents recorded in the CD and reproduction time thereof so that the attribute information adding unit 105 transmits the extracted identification information to the external server of the host computer via the data transmission/receiving portion 102. Meanwhile, the host computer identifies the selected disc based on the extracted information and the attribute information of the identified CD is transmitted to the data transmission/receiving portion 102. Thus, the attribute information corresponding to the audio contents recorded on the CD is sent from the external server to the attribute information adding unit 105 via the network interface 116.

When receiving the user's demand for purchase, the data transmission/receiving portion 102 is connected with the host computer and the desired music data is specified based on the ISRC information, obtaining the attribute information such as the charge amount information for secondary recording. The user finally indicates his intention based on the amount of the charge as to whether or not the music data is recorded onto the secondary recording medium 128. It is noted here that the user may specify the music data by directly specifying the music instead of using the ISRC information stored in the TOC area.

The data format judging portion 103 judges the input data format whether or not the music data is ciphered super distribution formatted data, namely, whether or not the input data is super distribution data, and judges the data input route based on the judgment. In the present embodiment, the data format judging portion 103 judges whether the music data received by the data transmission/receiving means 102 is obtained via internet or via CD medium. When the judgment is made that the music data is super distribution formatted, namely, obtained via internet, the received data is directly transferred to the user ID adding unit 107 where the music data is added with the user ID supplied from the user ID generation storage portion 114, and then the resultant data is recorded on the primary recording medium 109 via the first recording unit 108.

Meanwhile, when the judgment is made by the data format judging portion 103 that the music data is not super distribution formatted, namely, the data is obtained via the CD medium, the input data is preferably converted from LPCM (Linear Pulse Code Modulation) to MPEG2-AAC (Moving Picture Experts Group 2 Advanced Audio Coding, referred to as "AAC" hereinafter) and then appropriately ciphered, and the resultant ciphered data is primarily recorded on the primary recording medium 109.

In more detail, the contents of the non-ciphered music data obtained from the CD medium are converted by compression via the data compressing conversion portion 104 in a desired format. In this compressing conversion, the original music data recorded on CD is generally LPCM (Linear Pulse Code Modulation) format data. Such music data is compressed into MPEG-2AAC (Moving Picture Experts Group-2 Advance Audio Coding) format, for example. Since the secondary recording medium 128 uses a small-sized semiconductor memory or the like, this format does not generally have capacity as large as that of CD at present. In ACC system, data is compressed to about 1/10 in size so as to be recorded.

Moreover, when the judgment is made by the data format judging portion 103 that the music data is obtained via CD medium, the data transmission/receiving portion 102 receives attribute information 202 to 206 corresponding to the music data from the database of the external host computer, and the received attribute information is added to the compression-converted music data by the attribute information adding unit 105.

In this construction, the attribute information adding unit 105 identifies the received audio contents to specify the source data and obtains the attribute information corresponding to the identified audio contents from the external server via the data transmission/receiving portion 102. The received audio contents together with the obtained attribute information is converted to a super distribution data format via the data compressing conversion portion 104, attribute information adding unit 105 and via the first ciphering unit 106.

In the present invention, it is noted here that the primary recording medium 109 is not essential in the first data conversion apparatus 101 and the received input data may be transferred to be recorded to the secondary recording medium 128 without primarily recording the data on the hard disc of PC. In this case, the controller 115 controls the data transmission/receiving portion 102 and attribute information adding unit 105 so as to obtain the attribute information from the external database, corresponding to the audio contents of the music CD. Moreover, the controller 115 controls the data compressing conversion portion 104, attribute information adding unit 105 and first ciphering unit 106 so as to convert the received audio contents together with the obtained attribute information into the super distribution data format, and then controls the data output portion 112 so that the resultant data converted to the super distribution data format is outputted and supplied to the external recording apparatus 121 without executing the primary recording.

The first ciphering unit 106 ciphers the data contents 207 compressed by the data compressing conversion portion 103. At this time, the cipherment is performed with a ciphering key corresponding to the contents deciphering key 206. The ciphered data is added with the user ID 201 by the user ID adding unit 107, and then the resultant music data including the contents 207 together with the attribute information 201 to 206 is primarily recorded on the primary recording medium 109 via the first recording unit 108. Thus, the music data obtained from CD medium is converted to the data format same as that of the super distribution data distributed via internet as shown in FIG. 3. The primary recording medium 109 is generally composed of a hard disc of PC, which primarily records the music data desired by the user to the primary recording medium 109 in the same cipherment format as that of the super distribution data obtained via internet.

In the case where the music data is obtained from CD medium, as for the data structure of the super distribution data shown in FIG. 3, the ISRC information 202 stored in the TOC pattern area of CD can be directly used. In this case, the copy control information 203 and charge information 205 are obtained from the database of the system control center when the user indicates the intention of purchase by connecting the data transmission/receiving portion 102 with the host computer. Namely, the corresponding attribute information 203 and 205 are obtained from the host computer based on the ISRC information 202.

It is noted that, as to the cipherment of the contents 207, the ciphering key can be created in accordance with the contents deciphering key 206 transmitted from the host computer. Alternatively, in the case where it is desirable that the ciphering keys for ciphering the contents data 207 are varied for individual music data, the ciphering keys may be created by the first ciphering unit 106 based on the ISRC information specific to the individual music data. In this case, the contents deciphering key 206 is created based on the ciphering key created based on the ISRC information. When the cipherment of the contents is completed, the ciphering information 204 is set to "1" indicating "ciphered data".

FIG. 5 shows contents of a file which manage the data recorded on the primary recording medium 109. An index number 401 is allocated to the music data recorded on the primary recording medium 109 in the ascending order. Namely, in an example shown in FIG. 5, seven pieces of music data are recorded on the primary recording medium 109. A starting address 402 and end address 403 represent location places in the primary recording medium 109 where the music data are recorded, and these addresses are managed by sector numbers. When the music data is requested to be fetched from the primary recording medium 109, the recorded position of desired music data can be specified by updating the information shown in FIG. 5 at the time of recording.

Referring back to FIG. 2, the data fetching portion 110 fetches data to be recorded onto the secondary recording medium 128 from the primary recording medium 109. At this time, the management information shown in FIG. 5 is referred to and the recorded position of the desired data recorded in the primary recording medium 109 is specified so as to be fetched.

The first deciphering unit 111 deciphers the data fetched by the data fetching portion 110. This deciphering operation is a releasing (or decoding) process to the cipherment format of the super distribution data obtained via internet. At this time, as mentioned above, the attribute information (or attribute information together with contents information) is deciphered by the attribute deciphering key stored in the PC software for operating the copyright protecting system.

Among the data deciphered by the first deciphering unit 111, at least deciphered attribute information of user ID 201, ISRC information 202 and charge information 205 is transmitted to the charging portion 113. The charging portion 113 calculates a suitable amount of charge based on the charge information 205 of the deciphered attribute information. The amount of charge is transmitted to the host computer in the control center via the data transmission/receiving portion 102. That is, when a copy of the data having the super distribution data format is read out of the primary recording medium 109 to be supplied to the external recording apparatus 121, the controller 115 controls the charging portion 113 so that the charging portion 113 executes the charging operation of the super distribution data based on the charge information in cooperation with an charging device (not shown) of the system control center.

Meanwhile, among the deciphered data outputted from the first deciphering unit 111, the contents deciphering key 206 and contents 207 shown in FIG. 3 are transmitted to the second data conversion apparatus 121 via the data output portion 112. Here, in the present embodiment, the data transmission bus between the data output portion 112 of the first data conversion apparatus 101 and the data receiving portion 122 of the second data conversion apparatus 121 is realized by a PCMCIA bus of a personal computer (PC).

Thus, also the data obtained via CD medium is converted in cipherment format into a format which is the same as that of the super distribution format data obtained via internet by the first data conversion apparatus, so that the same ciphered data format can be outputted to the second data conversion apparatus 121 compatibly to both the via-internet distribution and the CD medium distribution.

Next, there will be described below the operation of the second data conversion apparatus 121. In the present embodiment, it is assumed that the second data conversion apparatus 121 is generally realized by a card adaptor of PCMCIA. The data receiving portion 122 receives the contents data 207 and contents deciphering key 206 outputted from the data output portion 112.

The second deciphering unit 123 deciphers the contents 207 of the data received by the data receiving portion 122. At this time, since a deciphering key required for deciphering the data 207 is included as the contents deciphering key 206 in the music data, as mentioned above, this deciphering key 206 is used to decipher the contents 207.

Next, there will be described below a procedure for secondarily ciphering and secondarily recording the deciphered contents 207 based on identifying information peculiar to the secondary recording medium 128. The first authentication unit 124 authenticates justification of the secondary recording medium 128, and is fixed in the second data conversion apparatus 121. The second authentication unit 127 similarly authenticates justification of the secondary recording medium 128 and is integral with the second recording medium 128. For example, when the secondary recording medium 128 is detachable, the second authentication unit 127 is fixed in the secondary recording medium 128.

There will be described below the authentication method. In this embodiment, it is assumed that the first authentication unit 124 transmits a specified command to the second authentication unit 127, and the second authentication unit 127 transmits a response command to the first authentication unit 124 so as to execute the authentication.

Figure 6:
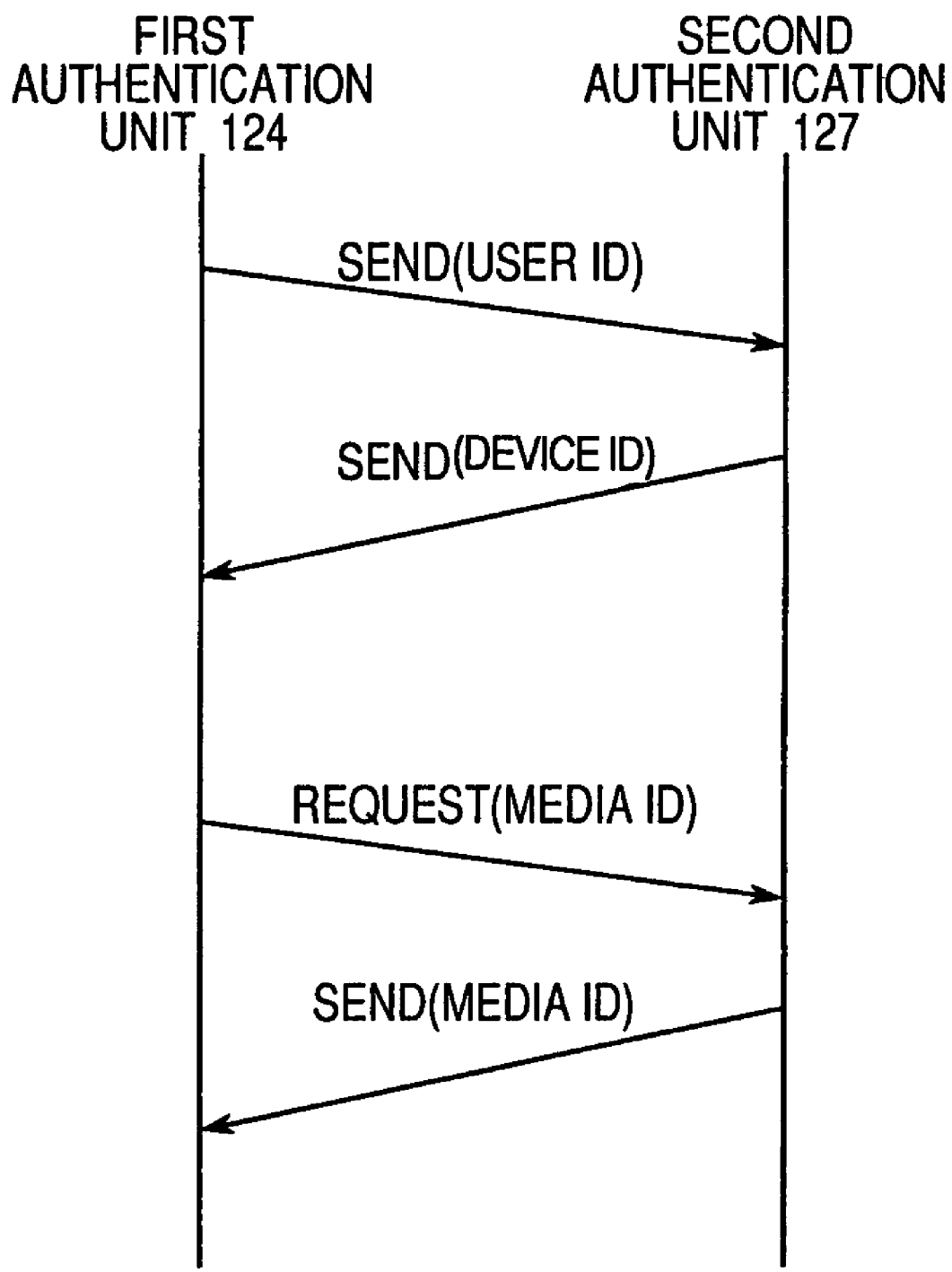
FIG. 6 is a diagram showing an authentication procedure in the first embodiment of the present invention.

FIG. 6 shows an example of the command/response between the first and second authentication units. At first, the first authentication unit 124 transmits a Send (User ID) command to the second authentication unit 127. The Send (User ID) command represents that the user ID 201 information created by the user ID generation storage portion 114 in the first data conversion apparatus 101 when the PC player soft peculiar to the copyright protecting system is installed in the PC, and then the user ID is fetched from the music data so as to be transmitted to the second authentication unit 127. When the ID information to be transmitted is correct at this time, the second authentication unit 127 transmits a Send (Device ID) command to the first authentication means 124 in response. The Send (Device ID) command represents that ID information peculiar to the second data conversion apparatus 121 is transmitted to the first authentication unit 124. When the ID information to be transmitted is correct at this time, the first authentication unit 124 transmits a Request (Media ID) command to the second authentication unit 127. This command requests transmission of the identification information peculiar to the secondary recording medium 128. When receiving this Request command, the second authentication unit 127 obtains the identification information peculiar to the secondary recording medium 128 and transmits the peculiar identification information as the Send (Media ID) command to the first authentication unit 124.

As mentioned above, the ID information peculiar to the first authentication unit 124 and the second authentication unit 127 is transmitted therebetween so that the authentication is executed, and only when the judgment is made that the apparatus is justified, the identification information peculiar to the secondary recording medium 128 is obtained.

The second ciphering unit 125 obtains the identification information peculiar to the secondary recording medium 128 obtained from the first authentication means 124 and creates a ciphering key based on the peculiar identification information so as to cipher the data outputted from the second deciphering unit 123. Thus, although the ciphered data recorded in the primary recording medium 109 may be of different cipherment format according to the data distribution route, the data can be converted to a cipherment format based on the identification information peculiar to the secondary recording medium 128 in the secondary ciphering process executed by the second ciphering unit 125.

Here, since the method of creating the ciphering key based on the peculiar identification information and ciphering data is disclosed in Japanese Patent Application Laid-Open No. 5-257816 (1993), the detailed description thereof is omitted here. The data to be recorded onto the secondary recording medium 128 is thus secondarily ciphered data based on the identification information peculiar to the secondary recording medium 128. Moreover, even if the recorded data of the secondary recording medium is to be copied, since the data is ciphered by the identification information peculiar to the recording medium, the data can not be deciphered normally at the time of reproduction, and thus the copyright of the data is protected.

The second recording unit 126 records the data secondarily ciphered by the second ciphering unit 125 onto the secondary recording medium 128. The secondary recording medium 128 for recording data is detachable from the second data conversion apparatus 121.

Figure 7:
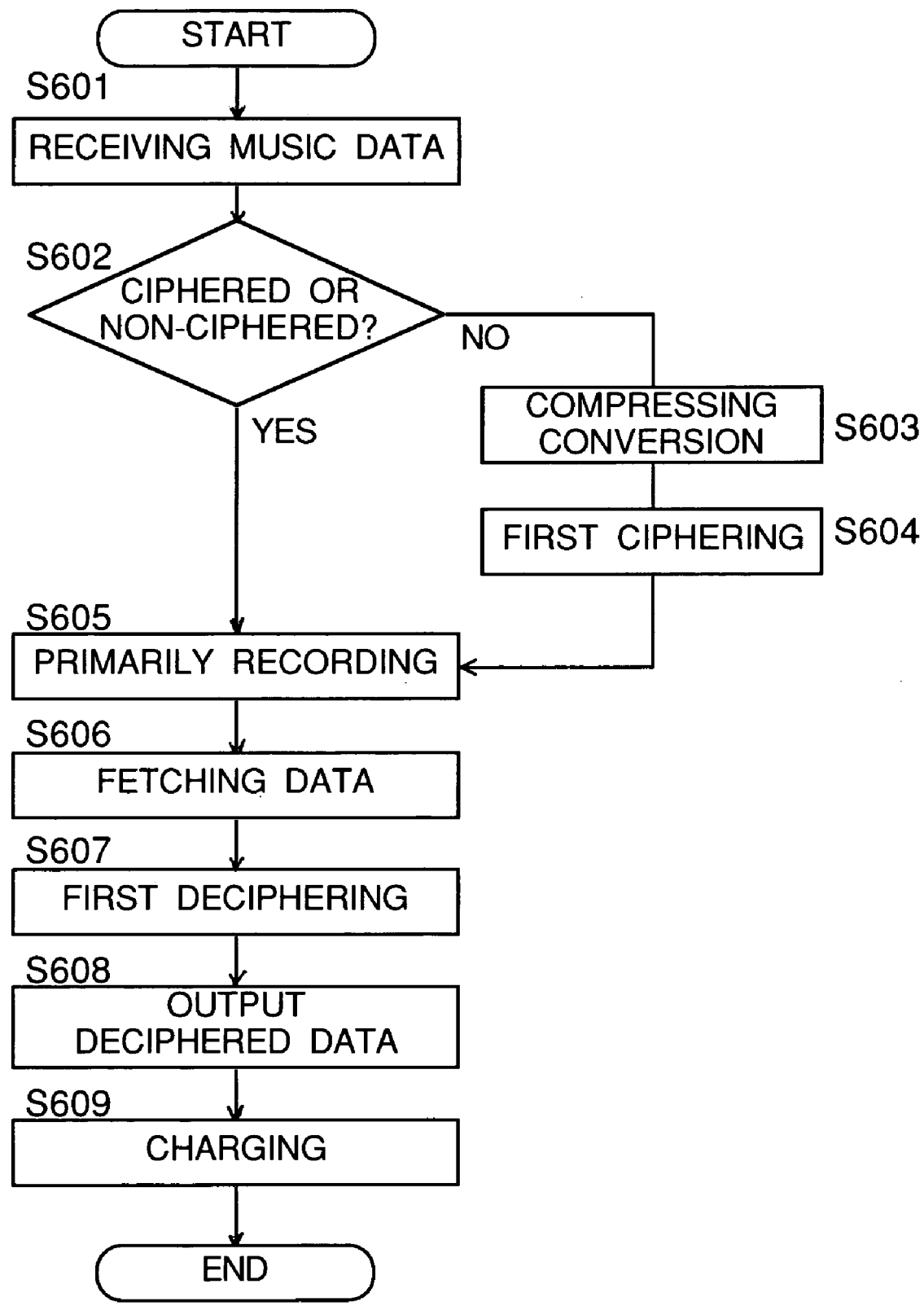
FIG. 7 is a flow chart showing an operation of a first data conversion device according to the first embodiment of the present invention.
Figure 8:
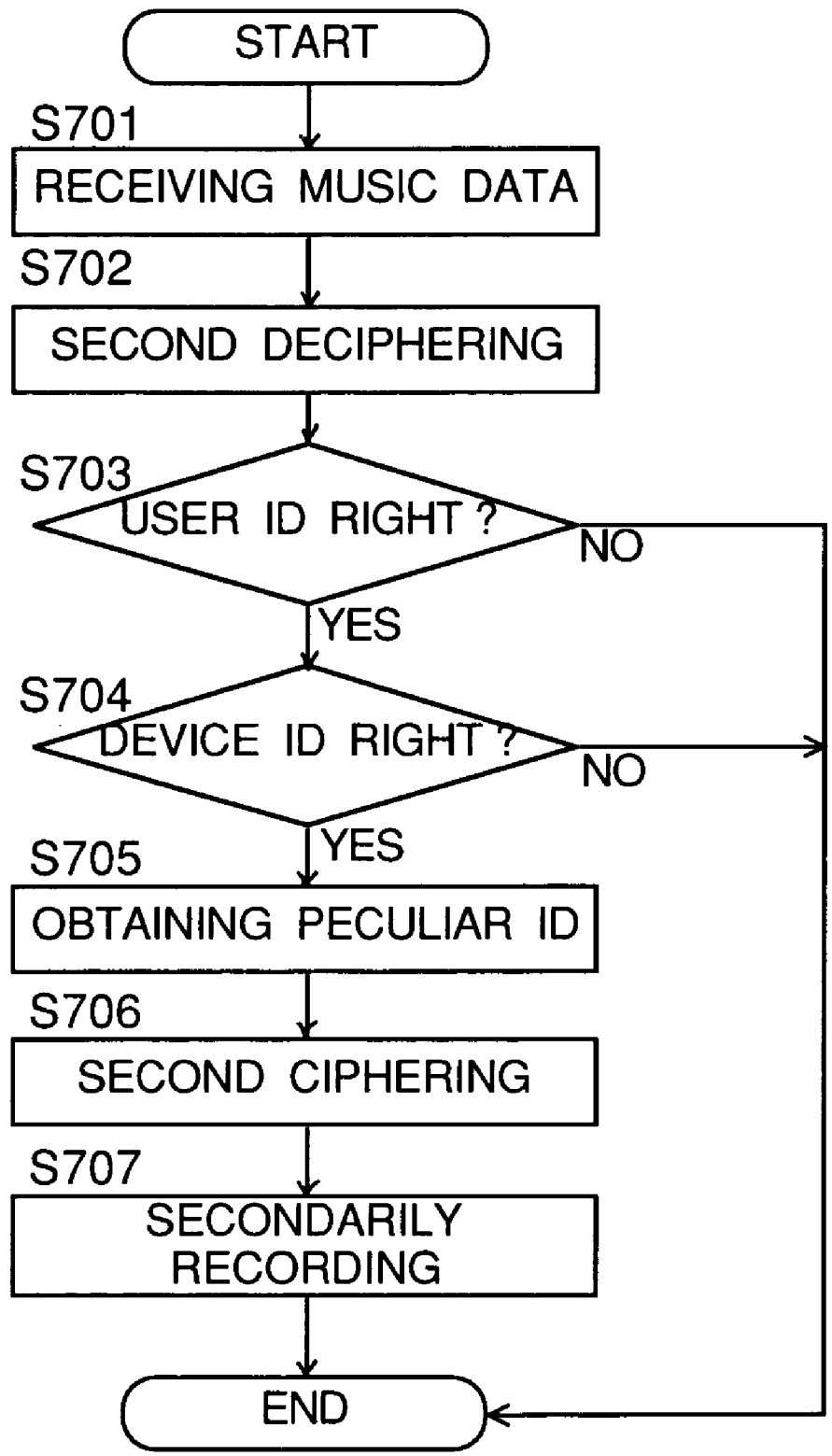
FIG. 8 is a flow chart showing an operation of a second data conversion device according to the first embodiment of the present invention.

The operation of the digital data copyright protecting system having the above constitution will be described below with reference to flow charts of FIGS. 7 and 8.

First, the operation of the first data conversion apparatus 101 will be described with reference to the flow chart of FIG. 7. The data transmission/receiving section 102 receives music data (S601). The data format judging portion 103 judges as to whether or not the data is ciphered (S602). When the data is not ciphered, the data is compressed by the data compressing conversion portion 104 (S603) so as to be added with the attribute information. Then, the contents data is ciphered by the first ciphering unit 106 (S604). The ciphered data is added with the user ID and the resultant data is recorded on the primary recording medium 109 (S605).

Meanwhile, when the data format judging portion 103 judges that the received data is previously ciphered super distribution data, the previously ciphered data is directly added with the user ID, and then primarily recorded on the primary recording medium 109 (S605).

Next, the primarily recorded data is fetched out of the primary recording medium 109 according to the secondary recording request made by the user (S606), and the fetched data of attribute information and contents are deciphered by the first deciphering unit 111 (S607). The deciphered data is outputted via the data output portion 112 (S608). Meanwhile, a suitable charging amount is calculated from the charge information in the attribute information so that the calculated amount is transmitted to the host computer (S609), and the process is ended.

Next, the operation of the second data conversion apparatus 121 will be described with reference to the flow chart of FIG. 8. The data receiving portion 122 receives the data outputted from the data output portion 112 of the first data conversion apparatus 101 (S701), and the second deciphering unit 123 deciphers the contents 207 of the data (S702). Next, the first authentication unit 124 transmits the user ID contained in the data to the second authentication unit 127, and the second authentication unit 127 judges as to whether or not the transmitted user ID is right (S703). When the judgment is made that the user ID is not right, the process is ended. When the judgment is made that the user ID is right, the second authentication unit 127 transmits its devise ID to the first authentication unit 124, and the first authentication unit 124 judges as to whether or not the transmitted device ID is right (S704). When the judgment is made that the device ID is not right, the process is ended. When the judgment is made that the device ID is right, the second authentication unit 127 is requested to obtain the identification information peculiar to the secondary recording medium 128, and the second authentication unit 127 obtains the identification information peculiar to the secondary recording medium 128 so that the peculiar identification information is transmitted to the first authentication unit 124 (S705). The second ciphering unit 125 ciphers the contents 207 based on the obtained peculiar identification information (S706), and the secondarily ciphered data is recorded onto the secondary recording medium 128 (S707) and the process is ended.

The description about the digital data copyright protecting system according to the first embodiment of the invention is ended.

There will be described below the digital copyright protecting system according to second embodiment of the present invention.

Embodiment 2

Since the digital data copyright protecting system according to the second embodiment has the constitution same as that of the digital data copyright protecting system according to the first embodiment, only a difference between the first and second embodiments will be described here. The second embodiment is different from the first embodiment in that an amount of charge can be changed according to a compressing conversion format of music data. Namely, when data of music CD is compressed and recorded primarily, compressing conversion formats and an amount of charge according to each compressing conversion format are presented to a user, and the user selects a suitable compressing conversion format based on the information.

FIG. 9 shows a relationship between the compressing system and an amount of charge. Since the music title 301, the singer's name 302, the price 303 and the data source name 304 were described in the first embodiment with reference to FIG. 4, the description thereof is omitted. A compression format 801 represents a compressing conversion format of music data, and the compressing conversion formats such as LPCM and AAC are displayed. The user refers to the compression format 801 and the price 303 and simultaneously selects a suitable compressing conversion format. The description about the second embodiment of the present invention is ended here.

There will be described below the digital data copyright protecting system according to a third embodiment of the present invention.

Embodiment 3

Since the digital data copyright protecting system according to the third embodiment has a constitution which is approximately same as that of the digital data copyright protecting system according to the first embodiment, only a difference therebetween will be described below, and the same reference numerals are given to identical components.

Figure 10:
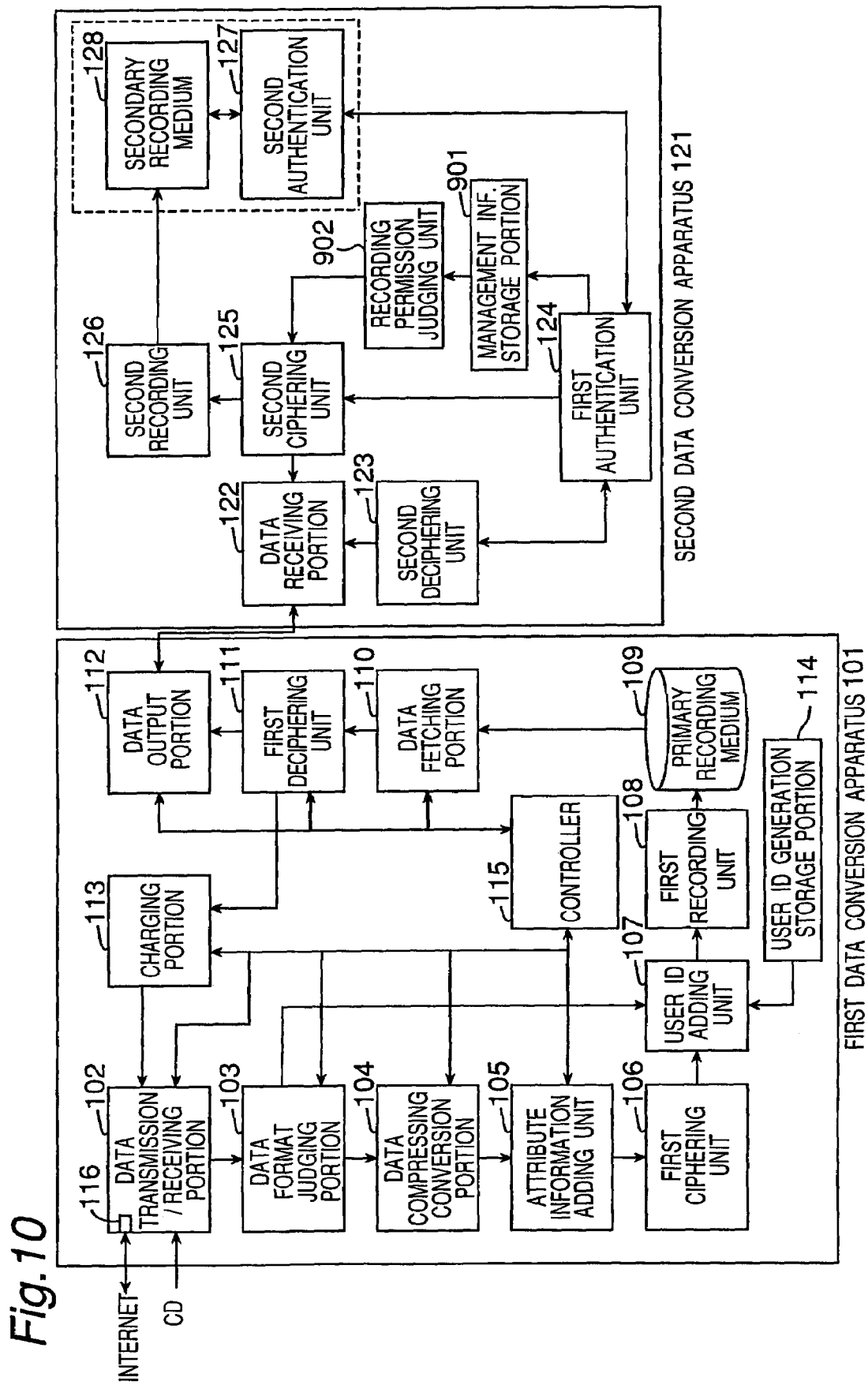
FIG. 10 is a block diagram showing a constitution of a digital data copyright protecting system according to a third embodiment of the present invention.

FIG. 10 shows the constitution of the digital data copyright protecting system according to the third embodiment. Since the first data conversion apparatus 101 has the constitution same as that described in the first embodiment, the description thereof is omitted.

The second data conversion apparatus 121 is composed of the data receiving portion 122, second deciphering unit 123, first authentication unit 124, second enciphering unit 125, second recording unit 126, second authentication unit 127, and secondary recording medium 128. The apparatus 121 further includes a recording data management information temporary storage portion 901 and a recording permission judging unit 902. The third embodiment is different from the first embodiment in that the second data conversion apparatus 121 includes the recording data management information temporary storage portion 901 and a recording permission judging unit 902. In this construction, the recorded information of music data and information in the secondary recording medium where the music data were recorded can be temporarily stored in the second data conversion apparatus 121.

The recording data management information temporary storage portion 901 manages the music data recorded in the second data conversion apparatus 121.

The recording data management information temporary storage portion 901 manages the music data recorded in the second data conversion apparatus 121.

Figure 11:
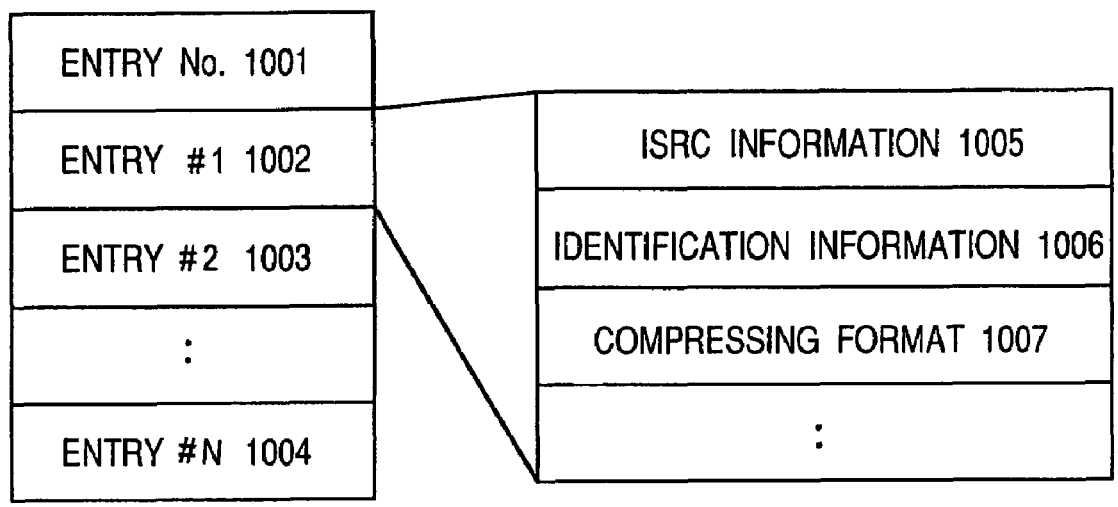
FIG. 11 is a diagram showing a data structure to be recorded in a recording data management information temporary memory unit.

FIG. 11 shows a data structure of the management information. An entry number 1001 represents a number of music data recorded on the recording data management information temporary storage portion 901, and the entry number 1001 takes integer values of not less than 0. Thereafter, as for entry #1 through entry #N, data is added only by a registered number of entries. ISRC information 1005 is ISRC information of music data to be recorded. Hereinafter, identification information 1006 is a value of identification information peculiar to the secondary recording medium 128 for recording the music data. A compressing format 1007 or the like of the music data is also recorded as the need arises. In such a manner, the music data recorded in the second data conversion apparatus 121 and the secondary recording medium 128 having the music data recorded thereon can be managed in the recording data management information temporary storage portion 901.

Here, there will be described below the case where the same music data is recorded by the same user on different secondary recording media 128. In the present embodiment, the recording permission judging unit 902 executes following three types of processes.

(1) In the case where the different secondary recording media 128 are used, the music data is not permitted to be recorded.

(2) In the case where the different secondary recording media 128 are used, if the music data which have already been recorded onto another recording medium is deleted, the recording is permitted.

(3) In the case where the different secondary recording media 128 are used, a suitable copyright charge is collected.

In the following description, the different secondary recording media 128 are a secondary recording medium 128A and a secondary recording medium 128B.

When the music data are first recorded onto the secondary recording medium 128A, it is checked that the music data to be recorded have not been recorded on the recording data management information temporary storage means 901, namely, the corresponding music data have not been recorded onto the recording data management information temporary storage means 901, and the ISRC information 1005 of the music data, the identification information 1006 peculiar to the secondary recording medium 128A and the like are recorded onto the secondary recording medium 128A.

Next, when the same music data is recorded onto the secondary recording medium 128B, the ISRC information 1005 is retrieved from the information in the recording data management information temporary storage portion 901, and it is checked that the coincided information exists, namely, the music data to be recorded have been recorded. Next, the identification information 1006 is referred to and a check is made as to whether or not it coincides with the identification information of the secondary recording medium 128B. When they coincide with each other, the recording permission judging unit 902 permits the music data to be recorded onto the secondary recording medium 128B.

(2) when the music data which is recorded on another recording medium where the music data (in the present embodiment, the secondary recording medium 128A) have been recorded are deleted and when the music data is recorded onto the secondary recording medium 128B, the recording is permitted. Namely, when the corresponding music data is deleted from the secondary recording medium 128A, the corresponding music data is deleted from the recording data management information temporary storage portion 901, and thus the recording becomes possible.

(3) a suitable amount of charge is presented to a user, and if the user agrees, the charging process is executed so that the recording onto the secondary recording medium 128B is permitted.

Here, the description about the digital data copyright protecting system according to the third embodiment is ended.

The above embodiments described only the example of the system which can expect the best effect under the present conditions. The present invention can be modified within the scope which does not deviate from its gist. More concretely, the following modification can be made.

The present embodiments describe the secondary recording medium 128 as a semiconductor memory, but it can be replaced by an optical disk such as a DVD-RAM or a hard disk.

The present embodiment described that when a user hopes to purchase digital data, the user downloads the digital data. However, such a form is also considered that digital data is once recorded onto the primary recording medium 109 in user's PC regardless of as to whether or not the digital data is purchased and the procedure for purchasing the digital data recorded on the primary recording medium 109 is executed.

The present embodiments describe that the digital data copyright protecting system is a personal computer, but the present invention is not limited to this and thus can be realized by a so-called STB (Set Top Box) for recording a broadcasting program.

The present embodiments describe that copy control information is included in attribute information, but it can be inserted into digital data in a format of water mark.

The present embodiments describe that charging information is transmitted to a control center via on-line. However, charging information is once recorded onto the primary recording medium 109 so as to be transmitted to a center within a proper period.

The present embodiments describe information provided by information provider as music information, but it is not limited to this, and thus, needless to say, such information may be image information, sound information, character information or a combination of image information, sound information and character information.

According to the data conversion system of the present embodiments, music data, which is non-ciphered data and recorded on a music CD or the like, is converted into a data format for network distribution and primarily recorded so that the data can be dealt similarly to the network distribution. As a result, when a copy is created beyond the scope of personal amusement, a suitable charge for a copyright can be collected, and a great effect can be produced.

What is claimed is:

1. A data conversion apparatus for use with an external recording apparatus and an external equipment, and for use in converting data including audio contents to superdistribution format data and outputting the superdistribution format data to be supplied to the external recording apparatus to be recorded therein, said superdistribution format data including said audio contents and attribute information which represents at least a charge condition permitting creation of a copy of the audio contents, and including identification information identifying a user of the data conversion apparatus, said data conversion apparatus comprising:

a data transmission/receiving section for transmitting and receiving data to and from the external equipment;

a data format judging section for judging whether or not data received by said data transmission/receiving section is of a superdistribution format;

an attribute information obtaining section for identifying the audio contents of the data and obtaining attribute information corresponding to the identified audio contents from the external equipment via said data transmission/receiving section;

a user ID storage section storing the identification information identifying the user of the data conversion apparatus;

a ciphering section ciphering the attribute information obtained from the external equipment and the identification information stored in said user ID storage section;

a data format conversion section adding said ciphered attribute information and identification information to the audio contents and thereby converting the audio contents together with the obtained attribute information to the superdistribution data format; and a controller for controlling said data transmission/receiving section, data format judging section, attribute information obtaining section and data format conversion section, wherein, in a case where said data format judging section judges that the received data is not of the superdistribution format, said controller controls said attribute information obtaining section so as to obtain the attribute information corresponding to the audio contents from the external equipment, and wherein said controller controls said data format conversion section so as to convert the audio contents of the received data together with the obtained attribute information into the superdistribution format data, so that the resultant data converted to the superdistribution data format is outputted and supplied to the external recording apparatus, wherein said data transmission/receiving section includes a data read-out portion for reading the data out of a disc medium recorded with the data containing the audio contents and includes a network interface which receives the attribute information corresponding to the audio contents from an external server via a digital network, and wherein said attribute information obtaining section obtains identification information read out of the disc medium and transmits the obtained information to the external server via the digital network and receives attribute information corresponding to the audio contents recorded in the disc medium identified by the identification information from the external server.

2. The data conversion apparatus as claimed in claim 1 further comprising a data outputting section, wherein in a case where said data format judging section judges that the received data is of the superdistribution format, said controller controls said data outputting section so as to supply the received superdistribution format data to the external recording apparatus.

3. The data conversion apparatus as claimed in claim 2 further comprising: a recording section for recording the superdistribution format data; and a charging section for executing a charging operation based on the charge condition of the attribute information, wherein said controller controls said charging section so as to execute the charging operation of the superdistribution format data based on the charge condition of the attribute information when a copy of the superdistribution format data read out of said recording section is supplied to the external recording apparatus to be recorded therein.

4. The data conversion apparatus as claimed in claim 1, wherein said attribute information obtaining section obtains the identification information of the disc medium by way of a user direct input operation.

5. The data conversion apparatus as claimed in claim 1, wherein said attribute information obtaining section obtains the identification information of the disc medium by extracting the number of pieces and reproduction time of the audio contents recorded in the disc medium.

6. The data conversion apparatus as claimed in claim 1, for use with an external charging device, wherein said network interface is connected to the external charging device via the digital network so that said charging section executes the charging operation based on the charge information in cooperation with the external charging device.

7. A data conversion apparatus for use with an external recording apparatus and an external equipment, and for use in converting data including audio contents to superdistribution format data and outputting the superdistribution format data to be supplied to the external recording apparatus to be recorded therein, said superdistribution format data including said audio contents and attribute information which represents at least a charge condition permitting creation of a copy of the audio contents, and including identification information identifying a user of the data conversion apparatus, said data conversion apparatus comprising:

a data transmission/receiving means for transmitting and receiving data to and from the external equipment;

a data format judging means for judging whether or not data received by said data transmission/receiving means is of a superdistribution format;

an attribute information obtaining means for identifying the audio contents of the data and obtaining attribute information corresponding to the identified audio contents from the external equipment via said data transmission/receiving means;

a user ID storage means for storing the identification information identifying the user of the data conversion apparatus;

a ciphering means for ciphering the attribute information obtained from the external equipment and the identification information stored in said user ID storage means;

a data format conversion means for adding said ciphered attribute information and identification information to the audio contents and thereby converting the audio contents together with the obtained attribute information to the superdistribution data format; and a controlling means for controlling said data transmission/receiving means, data format judging means, attribute information obtaining means and data format conversion means, wherein, in a case where said data format judging means judges that the received data is not of the superdistribution format, said controlling means controls said attribute information obtaining means so as to obtain the attribute information corresponding to the audio contents from the external equipment, and wherein said controlling means controls said data format conversion means so as to convert the audio contents of the received data together with the obtained attribute information into the superdistribution format data, so that the resultant data converted to the superdistribution data format is outputted and supplied to the external recording apparatus, wherein said data transmission/receiving means includes a data read-out portion for reading the data out of a disc medium recorded with the data containing the audio contents and includes a network interface which receives the attribute information corresponding to the audio contents from an external server via a digital network, and wherein said attribute information obtaining means obtains identification information read out of the disc medium and transmits the obtained information to the external server via the digital network and receives attribute information corresponding to the audio contents recorded in the disc medium identified by the identification information from the external server.

8. The data conversion apparatus as claimed in claim 7, further comprising:

a data outputting means, wherein in a case where said data format judging means judges that the received data is of the superdistribution format, said controlling means controls said data outputting means so as to supply the received superdistribution format data to the external recording apparatus.

9. The data conversion apparatus as claimed in claim 8, further comprising:

a recording means for recording the superdistribution format data; and a charging means for executing a charging operation based on the charge condition of the attribute information, wherein said controlling means controls said charging means so as to execute the charging operation of the superdistribution format data based on the charge condition of the attribute information when a copy of the superdistribution format data read out of said recording means is supplied to the external recording apparatus to be recorded therein.

10. The data conversion apparatus as claimed in claim 7, wherein said attribute information obtaining means obtains the identification information of the disc medium by way of a user direct input operation.

11. The data conversion apparatus as claimed in claim 7, wherein said attribute information obtaining means obtains the identification information of the disc medium by extracting the number of pieces and reproduction time of the audio contents recorded in the disc medium.

12. The data conversion apparatus as claimed in claim 7, for use with an external charging device, wherein said network interface is connected to the external charging device via the digital network so that said charging means executes the charging operation based on the charge information in cooperation with the external charging device.

* * * * *